(12) United States Patent
Dover et al.

(10) Patent No.: US 11,399,259 B1
(45) Date of Patent: Jul. 26, 2022

(54) CONTRABAND WIRELESS DEVICE DETECTION INTEGRATED INTO CONTROLLED-ENVIRONMENT FACILITY COMMUNICATION AND/OR MEDIA DEVICES

(71) Applicant: Securus Technologies, Inc., Carrollton, TX (US)

(72) Inventors: Patrick Dover, Hickory Creek, TX (US); Scott Passe, Forney, TX (US)

(73) Assignee: Securus Technologies, LLC, Carrollton, TX (US)

( * ) Notice: Subject to any disclaimer, the term of this patent is extended or adjusted under 35 U.S.C. 154(b) by 0 days.

(21) Appl. No.: 16/703,052

(22) Filed: Dec. 4, 2019

(51) Int. Cl.
| | |
|---|---|
| *H04W 4/029* | (2018.01) |
| *H04W 28/26* | (2009.01) |
| *H04W 24/10* | (2009.01) |
| *H04W 8/00* | (2009.01) |

(52) U.S. Cl.
CPC .......... *H04W 4/029* (2018.02); *H04W 8/005* (2013.01); *H04W 24/10* (2013.01); *H04W 28/26* (2013.01)

(58) Field of Classification Search
CPC . H04M 2203/2033; H04M 2203/6081; H04M 3/22; H04M 7/0078; H04M 3/436; H04L 67/22; H04L 65/1076; H04L 47/822; H04W 4/029; H04W 24/10; H04W 8/005; H04W 64/003; H04W 88/02; H04W 12/00503; H04W 12/12; H04W 24/00; H04W 4/38; H04W 64/00
See application file for complete search history.

(56) References Cited

U.S. PATENT DOCUMENTS

| | | | |
|---|---|---|---|
| 9,444,574 B2 * | 9/2016 | Johnson | H04K 3/80 |
| 2008/0057976 A1 * | 3/2008 | Rae | H04W 64/003 455/456.1 |
| 2018/0167774 A1 * | 6/2018 | Hodge | H04M 3/205 |
| 2018/0295560 A1 * | 10/2018 | Hodge | H04W 24/10 |

\* cited by examiner

*Primary Examiner* — Kwasi Karikari
(74) *Attorney, Agent, or Firm* — Fogarty LLP (57) ABSTRACT

Controlled-environment facility contraband wireless communication device detection uses one or more controlled-environment facility communication and/or media devices that each include a radio frequency detection mechanism configured to detect presence of electromagnetic energy emissions in one or more frequency bands reserved for wireless communication by wireless communication devices. Each controlled-environment facility communication and/or media device reports detection of the presence of electromagnetic energy emissions in one or more frequency bands reserved for wireless communication by wireless communication devices to an investigative data aggregation and analysis system. The location of the reporting device(s) and/or signal strength of the emission(s) may be used by the investigative data aggregation and analysis system to determine a location, within the controlled-environment facility, of a contraband wireless communication device emitting the electromagnetic energy emissions.

19 Claims, 5 Drawing Sheets

CONTRABAND WIRELESS DEVICE DETECTION INTEGRATED INTO CONTROLLED-ENVIRONMENT FACILITY COMMUNICATION AND/OR MEDIA DEVICES

TECHNICAL FIELD

The present disclosure relates generally to controlled-environment facility communications, more particularly to detection of contraband wireless devices in controlled-environment facilities, and specifically to integration of contraband wireless device detection into controlled-environment facility communication and/or media devices.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences, which may be typically referred to as "video visitation," and online chat sessions.

Traditional communication services provided residents of controlled-environment facilities (such as correctional facilities) include allowing residents (inmates) to place outbound phone calls to non-residents of the controlled-environment facility. Additionally, non-residents can typically schedule video visitation with residents (inmates) of the controlled-environment facility. Other types of communication available to controlled-environment residents include the ability to exchange email and canned text messages between residents and non-residents of the controlled-environment facility. Basically, all of these forms of communication aim to facilitate communication between a resident of a controlled-environment facility and a non-resident.

However, correctional facilities prohibit residents from engaging in unauthorized communications with individuals outside of the facility. In most correctional facilities, unauthorized cell phones, smartphones, cellular-enabled smartwatch or tablets, and other mobile communications devices that allow a resident to circumvent the approved facility communication systems are considered contraband. Use of contraband communications devices within a controlled-environment facility may pose a security risk and may allow for continued criminal activity by the residents. Possession of a contraband communications device is considered a violation of facility rules and such devices are confiscated by the facility staff when found.

Controlled-environment facility residents obtain access to contraband devices through many different sources, such as visiting family and friends or even facility staff. For example, inmates, or associates of inmates, may pay a member of prison staff, such as a corrections officer or civilian worker, to smuggle a contraband communications device, such as a cell phone, into a correctional institution. Residents use the contraband communications devices to circumvent the facility's communication systems, which would otherwise limit who the resident could call and would usually allow for monitoring and/or recording of resident calls. During their communications, inmates may make incriminating admissions, commit further criminal acts, conspire to commit further criminal acts, or leave a trail of incriminating data. Ordinarily, these actions and admissions may be monitored by facility communication systems and investigators. By circumventing the facility communication system, however, it may not be possible to monitor and detect such activities. For example, a correctional facility inmate may use a contraband cell phone to contact gang affiliates in an attempt to direct further criminal activity from within the facility. In another correctional environment example, an inmate may use a contraband smartphone or tablet device to access illegal images, including images of child pornography. In a general controlled-environment facility example, a resident may use the contraband communications device to contact friends and family in an effort to avoid payment of communications fees. Additionally, facilities typically make use of revenues derived from a resident's use of facility communication systems to operate, update, and maintain the facility communications system. When a resident circumvents the facility communication systems, financial revenue is lost, which could otherwise benefit the facility and other inmates and administration thereof. Many other illegal or illicit acts may be perpetrated by the use of contraband communications devices.

Authorities operating the controlled-environment facility often try to identify and block unauthorized use of contraband communications equipment. Existing methods for detecting and/or controlling access to contraband communications equipment include, for example, jamming frequencies used for cell phone communications and use of mobile detection equipment (e.g., "wands").

These methods have drawbacks. For example, jamming of communication frequencies is typically illegal in the United States. Managed access systems may allow access to corrections officers and/or staff, but limit access to unauthorized users within the facility, but such systems typically require significant investment in system installation and configuration. Mobile detection equipment may be circumvented by the inmates by simply turning the power off on the device. Also, over the past several years, the above-mentioned sharp increase in the U.S. inmate population has not been followed by a proportional increase in the number of prison or jail staff. To the contrary, budget pressures in local, state, and federal governments have made it difficult for correctional facilities to maintain an adequate number of wardens, officers, and other administration personnel. Hence, many correctional facilities are often unable to perform investigations with respect to their own inmates, such as using mobile equipment to sweep for contraband mobile communications devices, or the like.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide controlled-environment facility contraband wireless communication device detection that uses one or more controlled-environment facility communication and/or media devices. At least one of the one or more controlled-environment facility communication and/or media devices may be a controlled-environment facility personal communication and/or media device, which may be a controlled-environment facility personal resident communication and/or media device or a controlled-environment facility personal facility personnel communication and/or media device. Additionally, or alternatively, at least one of the one or more controlled-environment facility communication and/or media devices may be a controlled-environment facility resident communal communication and/or media terminal or docking station.

Each controlled-environment facility communication and/or media device is adapted to include a radio frequency detection mechanism configured to detect presence of electromagnetic energy emissions in one or more frequency bands reserved for wireless communication by wireless communication devices. This radio frequency detection mechanism may be powered by the respective controlled-environment facility communication and/or media device.

Each controlled-environment facility communication and/or media device is also configured to report detection of the presence of electromagnetic energy emissions in one or more frequency bands reserved for wireless communication by wireless communication devices to an investigative data aggregation and analysis system, or the like. This report may include a location of the controlled-environment facility communication and/or media device within the controlled-environment facility when reporting the detection of the presence of electromagnetic energy emissions, and/or signal strength of the electromagnetic energy emissions.

The investigative data aggregation and analysis system may employ the reported locations of the controlled-environment facility communication and/or media device(s) when reporting the detection of the presence of electromagnetic energy emissions, and/or the reported signal strength(s) of the electromagnetic energy emissions, to determine a location within the controlled-environment facility of a contraband wireless communication device emitting the electromagnetic energy emissions. For example, the investigative data aggregation and analysis system may determine a perimeter of a location of a contraband device emitting the electromagnetic energy emissions based, at least in part on the location and the signal strength reported by the controlled-environment facility communication and/or media device(s).

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described the invention in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

The present systems and methods relate generally to controlled-environment facility communications, more particularly to detection of contraband wireless devices in controlled-environment facilities, and specifically to integration of contraband wireless device detection into controlled-environment facility communication and/or media devices. In accordance with embodiments of the present systems and methods, for controlled-environment facility contraband wireless communication device detection use one or more controlled-environment facility communication and/or media devices that each include a radio frequency detection mechanism configured to detect presence of electromagnetic energy emissions in one or more frequency bands reserved for wireless communication by wireless communication devices. Each controlled-environment facility communication and/or media device reports detection of the presence of electromagnetic energy emissions in one or more frequency bands reserved for wireless communication by wireless communication devices to an investigative data aggregation and analysis system. The location of the reporting device(s) and/or signal strength of the emission(s) may be used by the investigative data aggregation and analysis system to determine a location, within the controlled-environment facility, of a contraband wireless communication device emitting the electromagnetic energy emissions.

Figure 1:
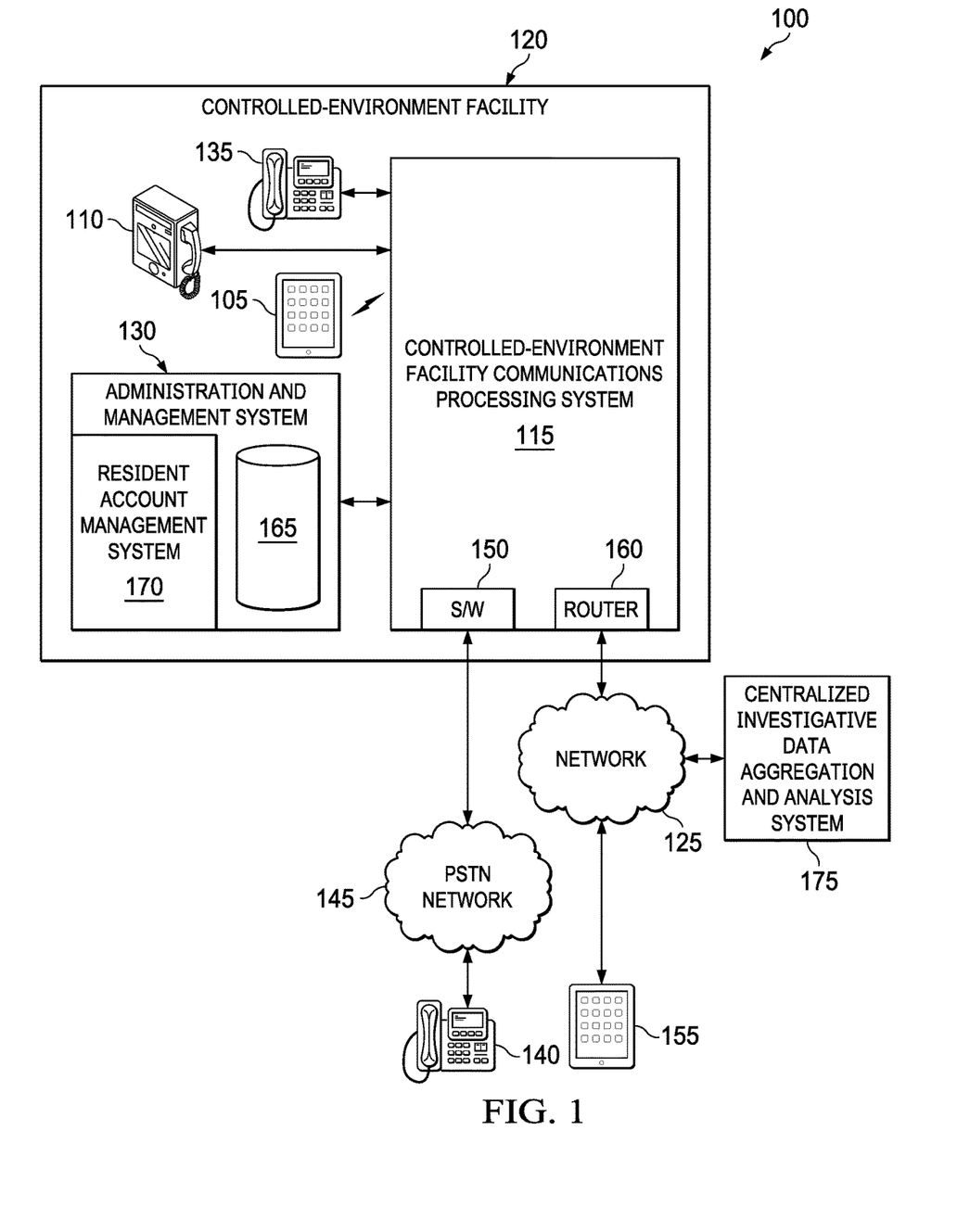
FIG. 1 is a diagrammatic illustration of an example communications environment, wherein an example embodiment of the present systems and methods for contraband wireless device detection may be integrated into controlled-environment facility communication and/or media devices, in accordance with some embodiments.

FIG. 1 is a diagrammatic illustration of example communications environment 100, wherein an example embodiment of the present systems and methods for contraband wireless device detection may be integrated into controlled-environment facility communication and/or media devices 105 and/or 110, in accordance with some embodiments.

In environment 100, communications processing system 115 may provide telephone services, videoconferencing, online chat, and other communication services to residents of controlled-environment facility 120. In some cases, such as illustrated, communications processing system 115 may be co-located with controlled-environment facility 120. Alternatively, or additionally, an external centralized communication processing system may be deployed in a controlled-environment facility communications provider data center, or the like. That is, communications processing system 115 may be centrally and/or remotely located with respect to one or more controlled-environment facilities and/or may provide communication services to multiple controlled-environment facilities. Such a controlled-environment facility communications provider data center may be connected to such facilities via a public network (e.g. the Internet) or a private network (e.g. intranet) 125, or the like (e.g. via a secure tunneling protocol over the internet, using encapsulation). Controlled-environment facility communication processing system(s) 115, and/or in conjunction with a controlled-environment facility Administration Management System (AMS) 130 (or a Jail Management System (JMS) in correctional environment embodiments) may be referred to as a "controlled-environment facility secure communication platform," or the like. More generally, however, it should be noted that communication system 115 may assume a variety of forms, including telephony switches such as electronic switching systems, or the like, and/or and may be configured to serve a variety of facilities and/or users, whether within or outside of a controlled-environment facility.

Residents may use more-or-less conventional telephones 135 to access certain communication services. However, in accordance with embodiments of the present systems and methods, residents may also use a controlled-environment facility resident communication and/or media device, or the like. For example, personal computer wireless devices, such as a tablet computing device or smartphone (105), which may have been adapted and/or approved for use in controlled-environment facility, may be used by controlled-environment facility residents for communication. Such a personal resident device may be referred to as an Intelligent Resident Device (IRD), "controlled-environment facility personal communication and/or media device," or the like, in controlled-environment facilities, in general. These may include "controlled-environment facility personal resident communication and/or media devices," and may be referred to as an Intelligent Inmate Device (IID), "inmate personal communications and/or media device," or the like, in a correctional institution environment. Similarly, controlled-environment facility personnel, such as correctional officers (guards), or the like, may be issued "controlled-environment facility personal facility personnel communication and/or media devices" (smartphones or tablet computing devices (105)) modified in accordance with embodiments of the present systems and methods for contraband device detection, but which may not be further adapted, as resident devices are. Additionally, or alternatively, a resident may use a "controlled-environment facility resident communal communication and/or media terminal or docking station" 110, or the like, to place voice calls, as well as for video communication, execution of other application programs (apps), including media apps, games, job search apps, etc. Such a controlled-environment facility video communication terminal or docking station may be referred to as an Intelligent Facility Device (IFD), which may be a video phone particularly adapted for use in a controlled-environment facility. Generally speaking, multiple controlled-environment facility resident communal communication and/or media terminals/docking stations//IFDs 110 are disposed in a controlled-environment facility, and may be disposed in a visitation room, in a pod, as part of a kiosk, as an alternative to a controlled-environment facility communication kiosk, etc. As will be appreciated, IRD 105, IFD 110, or other similar devices have video conferencing capabilities, or the like, to enable a party to participate in video communication sessions with other call parties, such as non-residents of the controlled-environment facility, via video communication, secure online chat, etc. Regardless, IFDs, IIDs, IRDs, controlled-environment facility issued personnel devices, etc. may be generally referred to herein as "controlled-environment facility communication and/or media devices."

Controlled-environment facility personal communication and/or media devices, IRDs 105 may be tablet computing devices, smartphones, media players, or the like adapted and/or approved for use by residents of the controlled-environment facility (within the controlled-environment facility). Each IRD 105 may be particularly adapted for use in a controlled environment. For example, in a correctional institution, jail, or the like, such an IRD, or IID, may have a specially adapted operating system and/or may be "stripped-down," particularly from the standpoint of what apps and/or hardware are provided or allowed on IRD 105, and/or connectivity afforded such an IRD. For example, such an IRD may employ an operating system kernel built for use in such an IRD in a controlled-environment facility. As a further example, the IRD may be adapted to only connect to a network provided by the controlled-environment facility, and/or in only certain locations, within the controlled-environment facility, such as may be controlled by availability of Wi-Fi access, or the like, only being available in certain areas. That is, for example, where streaming and/or downloading may be compartmentalized, leveraging the (concrete and steel) structure (i.e. construction, layout, etc.) of the controlled-environment facility, for example, limiting the availability of a Wi-Fi signal, providing the stream through the placement of wireless access points, antenna directionality of such wireless access points, and/or the like. Further, the IRD may allow access to apps or content only upon application of security measures, by the IRD. Such security measures may include determining, by the IRD, DNS spoofing, DNS redirection, use of proxy servers for privacy and security, biometric validation, password validation, and/or the like. Also, in accordance with embodiments of the present systems and methods, the IRD may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on IRDs might include apps of particular interest to residents of the controlled-environment facility. For example, IRDs provided to inmates of correctional facilities, might include apps that may be of particular use to an inmate, in general, such as access to a legal research service, or of more specific interest, such as providing an inmate nearing release, access to employment searching apps or the like. Hence, such inmate IRDs may be used to help soon to be released inmates transition. For example, the IRD may be used to communicate with a future employer, or the like. As such, IRDs may be sponsored, or otherwise subsidized by organizations or companies, assisting with the transition of inmates into society, or the like.

Likewise, as noted, controlled-environment facility personnel, such as correctional officers (guards), or the like, may be issued controlled-environment facility personal communication and/or media devices (smartphones or tablet computing devices (105)) modified in accordance with embodiments of the present systems and methods for contraband device detection, but which may not be further adapted, as resident devices are.

In various embodiments, controlled-environment facility resident communal communication and/or media terminals or docking stations, IFDs 110, may be implemented as a computer-based system. For example, each of IFD 110 may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). During a video communication session, IFD 110 may be configured to capture a video image of a resident to be transmitted to a non-resident using the camera, and to display a video image of the non-resident to the resident using the display. IFD 110 may also be configured to capture an audio signal from the resident to be transmitted to a non-resident using the mouthpiece portion of the handset, and to provide an audio signal from the non-resident to the resident using the earpiece portion of the handset. Additionally, or alternatively, audio received from the non-resident may be reproduced via a loudspeaker, and audio provided by the resident may be captured via a microphone. In some cases, IFD 110 may assume the form of any computer, tablet computer, smart phone, etc., or any other consumer device or appliance with videoconferencing capabilities. For example, in a correctional facility environment a tablet computing device (e.g., an IRD 105) may be mounted on a wall, in a hardened case, as a controlled-environment facility resident communal communication and/or media terminal or IFD. IFD 110 may also take the form of a docking station adapted to support and interface with an IRD 105.

In accordance with embodiments of the present systems and methods, a radio frequency (RF) detection mechanism, which may be an RF sensor configured to detect presence of electromagnetic energy emissions in one or more frequency bands reserved for wireless communication by wireless communication devices may be disposed in various ones of, or each of, the controlled-environment facility personal communication and/or media devices (105) and/or the controlled-environment facility resident communal communication and/or media terminals or docking stations (110) disposed in a controlled-environment facility (120). The operating system for each of these controlled-environment facility communication and/or media devices, or a persistent app running each of these controlled-environment facility communication and/or media devices (under the operating system) or the like, may, in accordance with embodiments of the present systems and methods report detection of the presence of electromagnetic energy emissions in one or more frequency bands reserved for wireless communication by wireless communication devices to investigative personnel, centralized investigative data aggregation and analysis system 175, other personnel associated with the controlled-environment facility (120) in which the reporting controlled-environment facility communication and/or media device is located, or the like.

In various embodiments, to access communication services, a resident may initiate approved telephone services by lifting the receiver on telephone 135 or IFD 110, and/or otherwise initiating a call, such as by launching a communications app on IRD 105 (or IFD 110). At which time, the resident may be prompted to provide a personal identification number (PIN), other identifying information and/or biometrics. An Interactive Voice Response (IVR) unit (not shown, but which may be integrated into communication processing system 115) may generate and play a prompt, or other messages, to the resident on device 105, 110 or 135. Under the control of communication processing system 115, devices 105, 110 and 135 may be capable of connecting to a non-resident's (i.e., a person not incarcerated or otherwise committed to a controlled-environment facility) telephone 140 across a Publicly Switched Telephone Network (PSTN) 145. For example, telephone 140 may be located at a non-resident's home or office, at a resident visitation center, etc. Telephony switch 150, in communication processing system 115, may be used to connect calls across PSTN 145. Additionally or alternatively, the non-resident may communicate using device 155, which may be a mobile phone, tablet computing device, personal computer, or the like, which may be connected through an Integrated Services Digital Network (ISDN), Voice-over-IP (VoIP), or packet data network (such as, for example the Internet), a wireless communications network, or the like 125. Telephony router 160 of communication processing system 115 is used to route data packets associated with a call connection to device 155. For example, a non-resident party may have a device 155 with a built-in front-facing camera, or the like, and an integrated display (e.g., a smart phone, tablet, etc., as illustrated), a personal computer with a webcam, etc. A network connection between the parties may be established and supported by an organization or commercial service that provides computer services and software for use in telecommunications and/or VOIP, such as SKYPE®. Additionally, or alternatively, the correctional facility and/or the destination may use videoconferencing equipment compatible with ITU H.323, H.320, H.264, and/or V.80, or other suitable standards.

In addition to providing certain visitation and communication operations, communication processing system 115 may attempt to ensure that a resident's calls, video conferences, online chats, etc. are performed only with non-residents whose identities, devices, email addresses, phone numbers, etc. are listed in that resident's Pre-Approved Contact (PAC) and/or Pre-Approved Number (PAN) list. Each resident's PAC and/or PAN list(s) may be stored, for example, in database 165 maintained by controlled-environment Administration and Management System (AMS) 130. In addition to PAC and/or PAN list(s), AMS 130 may also store Resident Profile Data (RPD), as well as communication and/or visitation rules applicable to each resident. As an example, in the context of a correctional facility, AMS 130 may be referred to as a Jail Management System (JMS). Within the AMS or JMS 130, database 165 may include information such as balances for resident trust and calling accounts; trial schedule; conviction data; criminal record; sentencing data, such as time served, time remaining to be served, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents. Controlled-environment facility resident account management system 170, which may be a separate system, or which may be a part or function of AMS 130, as illustrated, may maintain resident accounts to the benefit of the respective resident, such as resident commissary accounts, resident communications accounts, which may be used to pay for communications, such as phone calls, video visitation, internet chats, emails, text messages, or the like, etc.

In some implementations, communication processing system 115 may be configured to perform communication monitoring operations, such being configured to monitor and or record communication sessions (e.g., as electronic video files). In scenarios where communication processing system 115 is located within the controlled-environment facility, it may have direct access to AMS or JMS 130. In other embodiments, however, communication processing system 115 may be located remotely with respect to the controlled-environment facility, and access to AMS or JMS 130 may be obtained via a computer network such as, for example, network 125.

Thus, in accordance with embodiments of the present systems and methods, a controlled-environment facility communication and/or media device, IFD 110, IRD 105, or the like, may include at least one processor and a memory coupled to the at least one processor, such as discussed in greater detail below, with reference to FIGS. 2, 3 and 5. This memory may be configured to store program instructions executable by the at least one processor. Such program instructions may include a controlled-environment facility communication and/or media device operating system and/ or a controlled-environment facility app may report detection, by an RF sensor or the like, presence of electromagnetic energy emissions in one or more frequency bands reserved for wireless communication by wireless communication devices to investigative personnel, centralized investigative data aggregation and analysis system 175, other personnel associated with the controlled-environment facility (120) in which the reporting controlled-environment facility personal communication and/or media device 105 is located, or the like.

Centralized investigative data aggregation and analysis system 175 may be a platform for providing investigative tools in communication, such as via public network 150, with controlled-environment facility 120, namely controlled-environment facility communications processing system 115, controlled-environment facility administration and management system 130, and/or the like, which may thereby make up a "controlled-environment facility controlled-environment facility contraband wireless communication device detection system," or the like, such as may be used to carryout various embodiments of the present systems and methods. Such investigative tools may provide collection, processing, analysis, and/or reporting of information for intelligence purposes. Hence, in some embodiments of the present systems and methods, the alerts provided herein in response to detection, by an RF sensor, or the like, disposed in a controlled-environment facility communication and/or media device (105) or a controlled-environment facility resident communal communication and/or media terminal or docking station (110), presence of electromagnetic energy emissions in one or more frequency bands reserved for wireless communication by wireless communication devices, may be routed to, or via, centralized investigative data aggregation and analysis system 175, such as to alert or notify investigative personnel, other personnel associated with the controlled-environment facility (120) in which the reporting controlled-environment facility communication and/or media device is located, or the like. In some embodiments, the investigative tools may provide functions such as entity linkage analysis, communication statistics, organization analysis, communication behavior analysis, subscription usage analysis, common communication analysis, timelines, correlations, mapping, word search, language translation (whether machine translation or access to translation services), call recording (whether terminated external to the controlled-environment facility or internally thereto), call notification, call monitoring (whether real-time or recorded, and whether monitoring a particular call or a plurality of calls), call "barging," call control, visitation monitoring/background checking, crime tip conduit, account activity monitoring (whether tracing deposits and expenditures of monies or monitoring account trends and behavior, such as velocity of transactions), multiple database querying, and resource integration, and/or the like. One or more of these investigative tools may be provided through an intuitive user interface to provide ease of use, facilitate operation across a variety of user terminals, and/or to facilitate remote access to one or more features thereof. For example, in some cases, a web-based portal enabling individuals to store and transmit information, including forensic tools that analyze communications into and out of controlled-environment facilities to assist law enforcement may be provided. Such a web page portal may have menus comprising an investigator dashboard, to present and facilitate execution of various investigative operations. These investigative tools may log calls (e.g., as CDRs), so that an investigator may research them through an archive and may be provided access to internal and/or external criminal databases and/or other sources of useful information. As discussed further below centralized investigative data aggregation and analysis system 175, or the like, may function to determine, and/or refine, a location of a detected contraband wireless device, using location of the reporting controlled-environment facility communication and/or media device, signal strength, directionality, or the like of the detected electromagnetic energy emissions, data concerning the structure of the controlled-environment facility, triangulation, and/or the like.

Computer-based environment components may include programing and/or hardware to implement embodiments of the present systems and methods. This programming may take the form of stored program instructions, programed firmware, or the like, while hardware might take the form of an Application Specific Integrated Circuit (ASIC), or the like, to carry out such aspects of embodiments of the present systems and methods.

Figure 2:
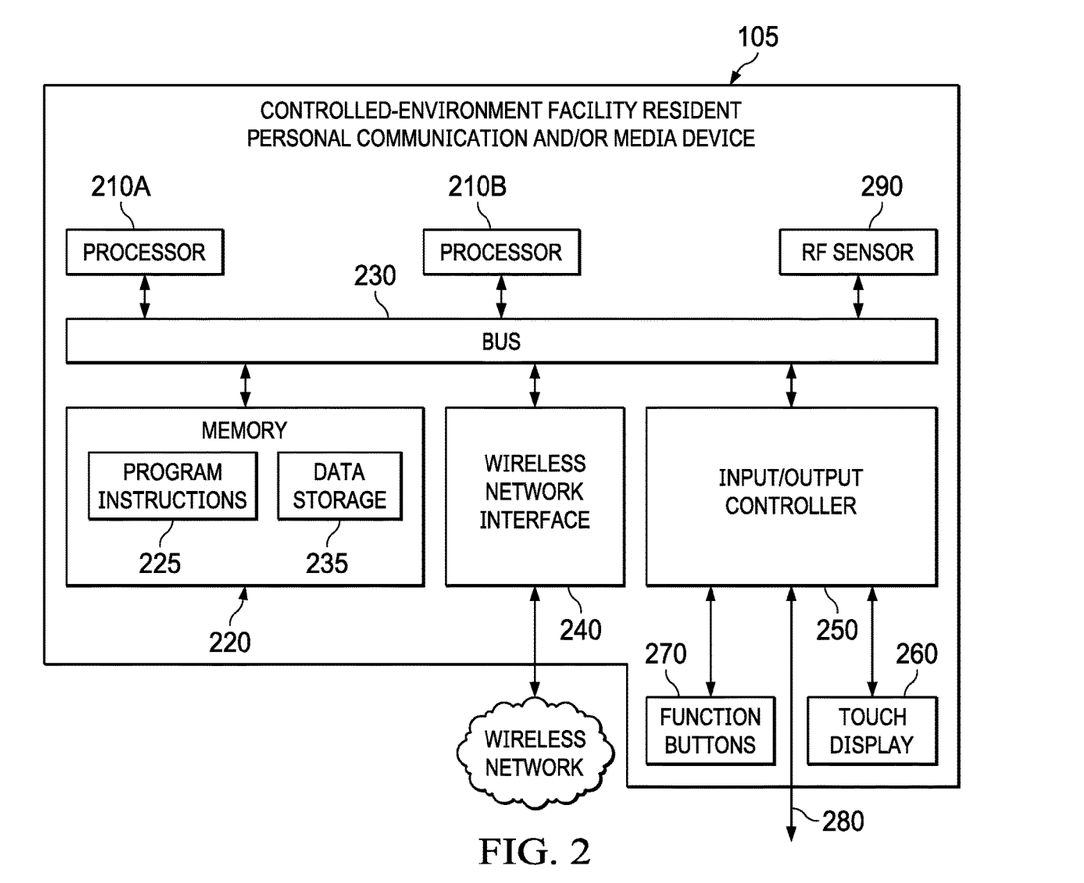
FIG. 2 is a block diagram illustrating exemplary components of a controlled-environment facility personal communication and/or media device, in accordance with some embodiments.

FIG. 2 is a block diagram illustrating exemplary components of example controlled-environment facility personal communication and/or media device 105, in accordance with some embodiments. Embodiments of the present systems and methods for contraband wireless device detection integrated into controlled-environment facility communication and/or media devices, as described herein, may be implemented at least in part as, or executed, at least in part, by controlled-environment facility personal communication and/or media devices 105, or the like. As noted these controlled-environment facility personal communication and/or media devices (smartphones or tablet computing devices (105)) may be controlled-environment facility personal resident communication and/or media devices adapted or otherwise approved for use by residents of the controlled-environment facility, within the controlled-environment facility, or may be controlled-environment facility personal communication and/or media devices (smartphones or tablet computing devices) issued to controlled-environment facility personnel, such as correctional officers (guards), or the like, and modified in accordance with embodiments of the present systems and methods for contraband device detection, but which may not be further adapted, as resident devices are. As illustrated, controlled-environment facility personal communication and/or media device 105 includes one or more processors 210A, 210B coupled to a system memory 220 via bus 230. Controlled-environment facility personal communication and/or media device 105 further includes a wireless network interface 240 coupled to bus 230, and one or more I/O controllers 250, which in turn are coupled to touch screen display 260, function buttons 270, I/O port 280, such as a wired connection (e.g., serial port, Universal Serial Bus port), or the like. Other devices may include, for example, microphones, antennas/wireless transducers, phone detection modules, etc.

In various embodiments, controlled-environment facility personal communication and/or media device 105 may be a single-processor system including one processor 210A, or a multi-processor system including two or more processors 210A, 210B (such as a microprocessor (and a graphics processor)). Processor 210(A) may be a processor capable of executing program instructions. Also, in some embodiments, one processor 210(B) may be a graphics processing unit (GPU) or another dedicated graphics-rendering device.

System memory 220 may be configured to store program instructions and/or data accessible by processor 210. In various embodiments, system memory 220 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 220 as program instructions 225 and data storage 235, respectively.

In an embodiment, bus 230 may be configured to coordinate I/O traffic between processor 210, system memory 220, network interface 240, etc. In some embodiments, bus 230 may perform any necessary protocol, timing, or other data transformations to convert data signals from one component (e.g., system memory 220) into a format suitable for use by another component (e.g., processor 210). In some embodiments, bus 230 may include support for devices attached through the Universal Serial Bus (USB) standard, for example. In some embodiments some or all the functionality of bus 230, such as an interface to system memory 220, may be incorporated directly into processor(s) 210A, 210B.

Wireless network interface 240 and/or I/O controller 250 may be configured to allow data to be exchanged between controlled-environment facility personal communication and/or media device 105 and controlled-environment facility communication processing system 115, or the like. Wireless network interface 240 may be adapted to communicate via a wireless connection (e.g., Wi-Fi, Bluetooth, Near Field Communications Link, etc.)

I/O controller(s) 250 may, in some embodiments, enable communications with touch screen display 260, function buttons 270, I/O port 280 such as a wired connection (e.g., serial port, Universal Serial Bus port), or the like. Multiple I/O controllers 250 may be present in controlled-environment facility personal communication and/or media device 105. In some embodiments, I/O devices may be separate from controlled-environment facility personal communication and/or media device 105 and may interact with controlled-environment facility personal communication and/or media device 105 through a wired connection, such as via port 280, or wireless connection, such as over wireless network interface 240

As shown in FIG. 2, system memory 220 may include program instructions 225, configured to implement certain embodiments described herein, and data storage 235, comprising various data may be accessible by program instructions 225. In an embodiment, program instructions 225 may include software elements, which may be configured to affect the operations discussed in FIG. 4. Program instructions 225 may be implemented in various embodiments using any desired programming language, scripting language, or combination of programming languages and/or scripting languages. Data storage 235 may include data that may be used in these embodiments. In other embodiments, other or different software elements and data may be included.

In accordance with embodiments of the present systems and methods radio frequency detection mechanism 290, which may be an RF sensor, or the like, configured to detect presence of electromagnetic energy emissions in one or more frequency bands reserved for wireless communication by wireless communication devices, is communicatively coupled to bus 230, and therethrough, or more directly, to processor 210, etc. or directly to processor 210. Program instructions 225, which may include portions of the operating system for controlled-environment facility personal communication and/or media device 105, a persistent app running on controlled-environment facility personal communication and/or media device 105 (under the operating system, or the like, may, in accordance with embodiments of the present systems and methods report detection of the presence of electromagnetic energy emissions in one or more frequency bands reserved for wireless communication by wireless communication devices to investigative personnel, centralized investigative data aggregation and analysis system 175, other personnel associated with the controlled-environment facility (120) in which the controlled-environment facility personal communication and/or media device 105 is located, or the like.

A person of ordinary skill in the art will appreciate that controlled-environment facility personal communication and/or media device 105 illustrated in FIG. 2 is merely illustrative and is not intended to limit the scope of the disclosure described herein. The controlled-environment facility personal communication and/or media device 105 and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other controlled-environment facility personal communication and/or media device configurations.

Figure 3:
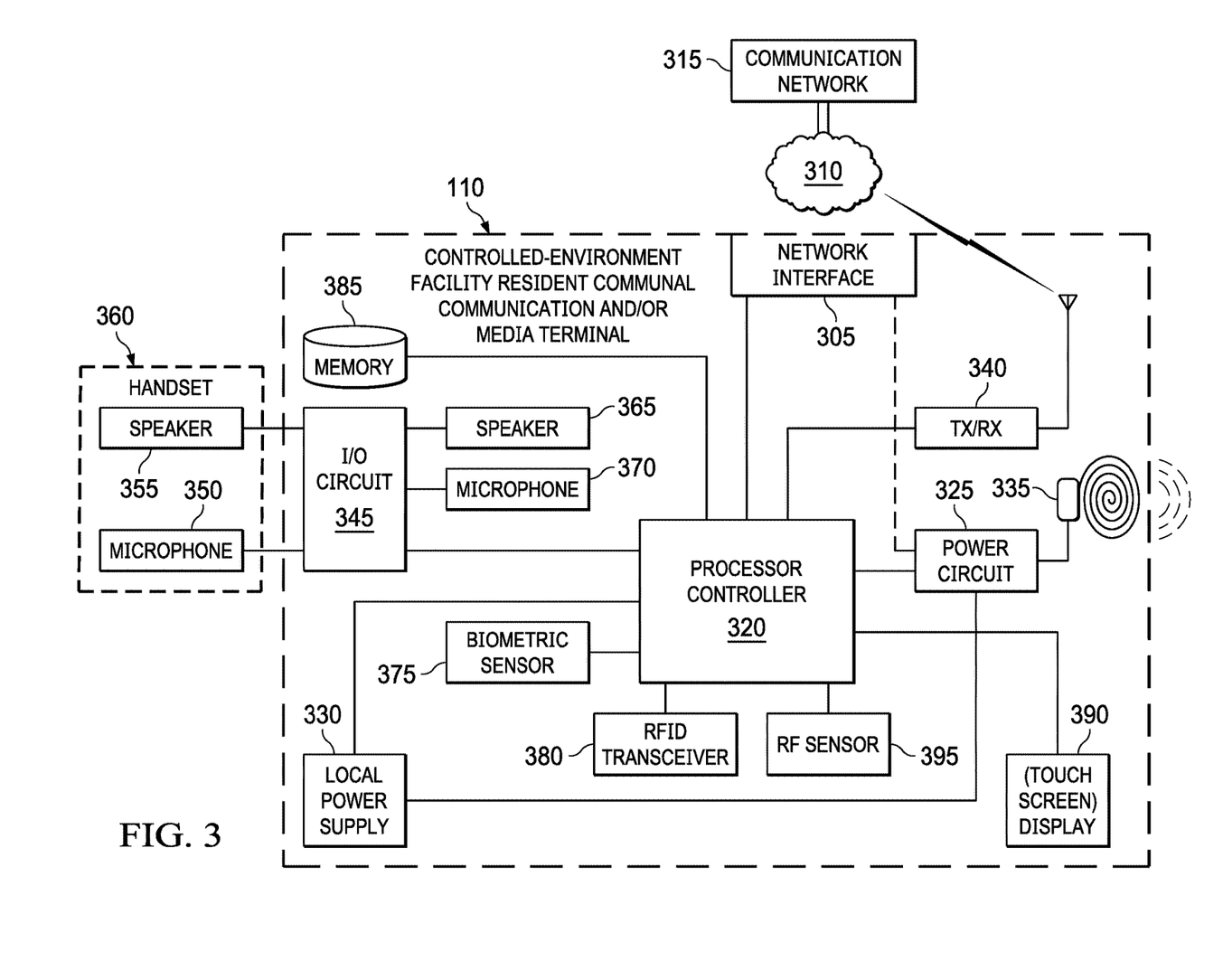
FIG. 3 is a block diagram illustrating components of a controlled-environment facility resident communal communication and/or media terminal or docking station, in accordance with some embodiments.

FIG. 3 is a block diagram illustrating components of controlled-environment facility resident communal communication and/or media terminal or docking station 110, in accordance with some embodiments. Controlled-environment facility resident communal communication and/or media terminal or docking station 110 has a network interface 305 adapted to connect to controlled-environment facility network 310. In some embodiments, network 310 is a network of single pairs of low-voltage wires, such as telephone wires (e.g., a twisted pair of copper wires), alarm system wires, intercom wires, etc. Each pair of low-voltage wires may terminate in the form of a telephone jack, connector, or the like for connection to network interface 305. In other embodiments, network 310 may be an Ethernet network that is connected to network interface 305 by a Cat 5 or 6 cable or other communication or data network that is connected to network interface 305 by a coaxial or other cable.

In some embodiments, communication network 315 may include controlled-environment facility communications processing system 115 and/or an extended signaling and electrical powering system that provides electrical power and/or communications to controlled-environment facility resident communal communication and/or media terminal or docking station 110 over network 310. An example extended signaling and electrical powering system 305, 310, 315 is described in U.S. Pat. No. 8,594,314, titled "Extended Signaling System and Method," the disclosure of which is hereby incorporated by reference herein in its entirety. The extended signaling and electrical powering system in network 315 may enable a source of electrical current to deliver an amount of current over the same existing wiring that is higher than ordinarily provided to enable telephone use over a single pair of low-voltage wires. The extended signaling and electrical powering system in network 315 may also enable the exchange of telephony and non-telephony signals (e.g., data) between communication system network 315 and controlled-environment facility resident communal communication and/or media terminal or docking station 110.

Controller 320 manages and controls the operation of controlled-environment facility resident communal communication and/or media terminal or docking station 110 in some embodiments. Controller 320 may be a microprocessor or application-specific integrated circuit (ASIC) that allows for intelligent operation of controlled-environment facility resident communal communication and/or media terminal or docking station 110 by executing software or firmware instructions. In some embodiments, controller 320 functions as a modem to provide a Digital Subscriber Line (DSL) data connection between controlled-environment facility resident communal communication and/or media terminal or docking station 110 and communication network 315. In other embodiments, network 305 and controller 320 may be hardwired circuitry (e.g., filters, splitters, rectifiers, matching circuits) adapted to couple lines from network 315 to various components in controlled-environment facility resident communal communication and/or media terminal or docking station 110.

Controlled-environment facility resident communal communication and/or media terminal or docking station 110 includes a power circuit 325 that provides charging and/or operating power to controlled-environment facility resident communal communication and/or media terminal or docking station 110 and to any controlled-environment facility personal communication and/or media device 105 linked thereto. Power circuit 325 may receive power from communication network 315 directly or under control of controller 320. In some embodiments, a local power supply 330 may provide power to controlled-environment facility resident communal communication and/or media terminal or docking station 110 and power circuit 325 in addition to or in place of power from network 315. Power supply 330 may be a battery, an AC adapter, or any other power source that is charged, for example, by current from network 315. Power circuit 325 may provide power directly to controlled-environment facility personal communication and/or media device 105 through a connector. Additionally, or alternatively, power circuit provides power via wireless power transmitter 335 (e.g., a coil, armature, or antenna) to a corresponding wireless power receiver in controlled-environment facility personal communication and/or media device 105.

Wireless transceiver 340 may provide a radio frequency (RF) interface (e.g., based on Wi-Fi, Bluetooth, ZigBee, WiMAX, Near-field communication (NFC), or other communication protocols or standards) and may exchange data and/or audio wirelessly between controlled-environment facility resident communal communication and/or media terminal or docking station 110 and controlled-environment facility personal communication and/or media devices 105, such as via a controlled-environment facility wireless network (which may be a part of controlled-environment facility network 310, communications network 315, or the like).

Controlled-environment facility resident communal communication and/or media terminal or docking station 110 further includes an input/output circuit 345 that provides an interface to microphone 350 and speaker 355. Input/output circuit 345 receives audio/speech signals from microphone 350 and provides audio/speech signals to speaker 355. Microphone 350 and speaker 355 may be discrete components in controlled-environment facility resident communal communication and/or media terminal or docking station 110 and/or may be embodied in a handset 360. In some embodiments, in place of a separate handset 360, controlled-environment facility resident communal communication and/or media terminal or docking station 110 may function as a speakerphone having a built-in speaker 365 and microphone 370.

Controlled-environment facility resident communal communication and/or media terminal or docking station 110 may include a biometric sensor 375 that is coupled to controller 320. Biometric sensor 375 may be used, for example, to verify and/or authenticate a user's identity using facial recognition, fingerprints, finger geometry, iris recognition, vein recognition, retina scanning, voice recognition, or DNA matching.

Other technologies may also be used to verify and/or authenticate a user's identity. For example, controlled-environment facility resident communal communication and/or media terminal or docking station 110 may include a radio-frequency identification (RFID) transceiver, interrogator, or reader 380 that is configured to automatically identify and track RFID tags. These RFID tags may be attached to objects or people. For example, RFID tags may be attached to tamper-detecting bracelets that are worn by users and/or attached to controlled-environment facility personal communication and/or media devices 105. Controlled-environment facility resident communal communication and/or media terminal or docking station 110 can be configured to require detection of a known user RFID tag and/or a known controlled-environment facility personal communication and/or media device 105 RFID tag before allowing a controlled-environment facility personal communication and/or media device to be used with controlled-environment facility resident communal communication and/or media terminal or docking station 110.

Applications may be stored on and executed on controlled-environment facility resident communal communication and/or media terminal or docking station 110. Memory 385 may store application software and/or data for execution or use by controller 320. Icons applications stored and executable on controlled-environment facility resident communal communication and/or media terminal or docking station 110 may be shown on (touch screen) display 390.

As noted, IFD 110 may also take the form of a docking station adapted to support and interface with an IRD 105. For example, such a docking station may have an area adapted to hold an IRD, or the like and provide a direct or indirect electronic connection.

In accordance with embodiments of the present systems and methods radio frequency detection mechanism 395, which may be an RF sensor configured to detect presence of electromagnetic energy emissions in one or more frequency bands reserved for wireless communication by wireless communication devices, is communicatively coupled to controller 320. Program instructions, such as in memory 385, which may include portions of an operating system for controlled-environment facility resident communal communication and/or media terminal or docking station 110, a persistent app running on controlled-environment facility resident communal communication and/or media terminal or docking station 110 (under the operating system, or the like) may, in accordance with embodiments of the present systems and methods report detection of the presence of electromagnetic energy emissions in one or more frequency bands reserved for wireless communication by wireless communication devices to investigative personnel, centralized investigative data aggregation and analysis system 175, other personnel associated with the controlled-environment facility (120) in which the controlled-environment facility resident communal communication and/or media terminal or docking station 110 is located, or the like.

A person of ordinary skill in the art will appreciate that controlled-environment facility resident communal communication and/or media terminal or docking station 110 illustrated in FIG. 3 is merely illustrative and is not intended to limit the scope of the disclosure described herein. Controlled-environment facility resident communal communication and/or media terminal or docking station 110 may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other controlled-environment facility resident communal communication and/or media terminal or docking station configurations.

Figure 4:
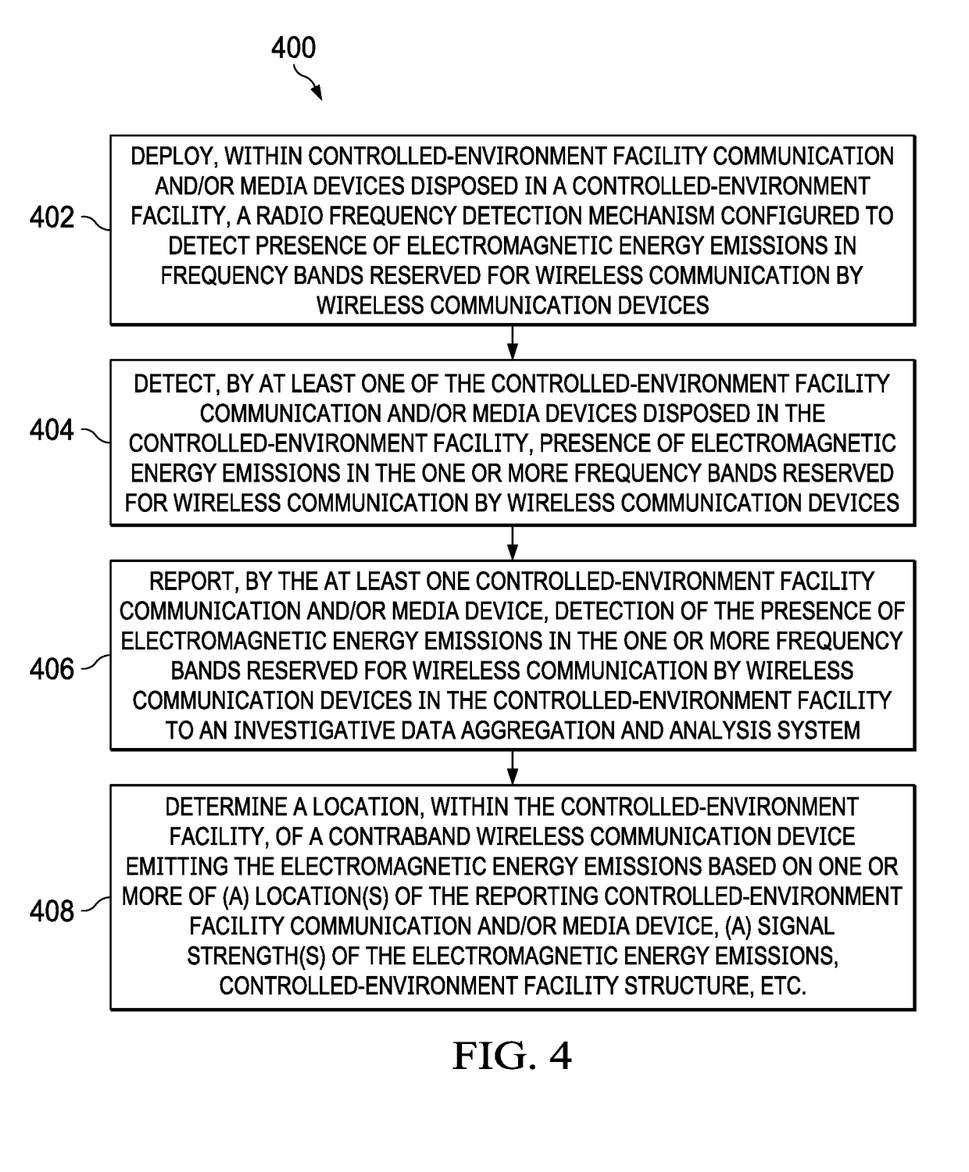
FIG. 4 is a flowchart of an example process for controlled-environment facility contraband wireless communication device detection integrated into controlled-environment facility communication and/or media devices, according to some embodiments.

FIG. 4 is a flowchart of example process 400 for controlled-environment facility contraband wireless communication device detection, according to some embodiments. Therein, at 402, a radio frequency detection mechanism, which may at least include an RF sensor, is deployed, within one or more controlled-environment facility communication and/or media devices disposed in a controlled-environment facility. The controlled-environment facility communication and/or media devices may, as discussed above, be mobile controlled-environment facility personal resident and/or facility personnel communication and/or media devices, such as IRDs 105, and/or in controlled-environment facility resident communal communication and/or media terminals or docking stations, such as IFDs 110. The radio frequency detection mechanism is configured to detect presence of electromagnetic energy emissions in one or more frequency bands reserved for wireless communication by wireless communication devices, at 402. Thereby, the deployment of the radio frequency detection mechanism in the controlled-environment facility communication and/or media device(s) configure the controlled-environment facility communication and/or media device(s), detect presence of electromagnetic energy emissions in one or more frequency bands reserved for wireless communication by wireless communication devices, at 402. The radio frequency detection mechanism in a controlled-environment facility personal communication and/or media device may be powered by the respective controlled-environment facility communication and/or media device, in which it is deployed (e.g. by a battery of the respective device). Thereby, each controlled-environment facility personal communication and/or media device 105 in which a radio frequency detection mechanism is deployed provides a mobile controlled-environment facility contraband detection apparatus. Additionally or alternatively, each fixed location controlled-environment facility resident communal communication and/or media terminals 110, including docking stations, in which a radio frequency detection mechanism is deployed may provide a fixed location controlled-environment facility contraband detection mechanism, wherein the radio frequency detection mechanism may be powered by the same mechanism as the respective controlled-environment facility resident communal communication and/or media terminal or docking station in which it is deployed (e.g., by a POTS/PSTN (or extended network) twisted wire-pair).

At 404, at least one of these radio frequency detection-enabled controlled-environment facility communication and/or media devices deployed in the controlled-environment facility, detects presence of electromagnetic energy emissions in one or more frequency bands reserved for wireless communication by wireless communication devices.

At 406, the device reports such detection of the presence of electromagnetic energy emissions in one or more frequency bands reserved for wireless communication by wireless communication devices in the controlled-environment facility to, or through investigative personnel, centralized investigative data aggregation and analysis system 175, or the like. This report may be made, to controlled-environment facility personnel other personnel associated with the controlled-environment facility (120) in which the controlled-environment facility communication and/or media device is located, or the like, such as for purposes of determining whether the signal is from a contraband wireless device, and if so, its location.

Such reports of detection of the presence of electromagnetic energy emissions indicative of a contraband device operating in the controlled-environment facility, and the location thereof may take the form of an alert, issued upon such detection or following refinement of the location, at 408 below, to controlled-environment facility personnel, such as correctional officers (guards), investigators, or the like. Such alerts may be sent as an email, a text, a message on an app operating on a device of the recipient, or the like.

As noted, the report by the controlled-environment facility communication and/or media device(s) may include information about the location, within the controlled-environment facility, of the controlled-environment facility communication and/or media device when detecting, and/or reporting the detection, of the presence of electromagnetic energy emissions. Additionally, or alternatively, the report made at 406 by the controlled-environment facility communication and/or media device(s) may include information about a signal strength of the electromagnetic energy emissions.

At 408, controlled-environment facility investigation system 175, or the like, may refine a location, within the controlled-environment facility, of a contraband wireless communication device emitting the electromagnetic energy emissions, by determining an area, such as a perimeter, of a location of contraband device emitting the electromagnetic energy emissions based, at least in part on the location and the signal strength reported at 406 by the controlled-environment facility communication and/or media device(s). Also, or alternatively, at 408 the controlled-environment facility investigation system, or the like, may refine the location, within the controlled-environment facility, of the contraband wireless communication device emitting the electromagnetic energy emissions, based at least in part on reported locations of more than one (i.e., two, three, or more) controlled-environment facility communication and/or media devices when reporting the detection of the presence of electromagnetic energy emissions, using triangulation, or the like. Further in this regard, the controlled-environment facility investigation system, or the like, may (further) refine the location, within the controlled-environment facility, of the contraband wireless communication device emitting the electromagnetic energy emissions, at 408, based, not only on reported locations of more than one controlled-environment facility communication and/or media devices when reporting the detection of the presence of electromagnetic energy emissions, but by also based on the signal strength reported by each of these controlled-environment facility communication and/or media devices, at the reported location, using triangulation, or the like. Still further in this regard, the controlled-environment facility investigation system, or the like, may (further) refine the location, within the controlled-environment facility, of the contraband wireless communication device emitting the electromagnetic energy emissions, at 408, based, not only on reported locations of one or more controlled-environment facility communication and/or media devices when reporting the detection of the presence of electromagnetic energy emissions, but by also based on the signal strength reported by each of these controlled-environment facility communication and/or media devices, at the reported location, in light of facility structure and/or at or adjacent to the reported location. For example, if a report is received from a device that is adjacent to one or more walls that would block a contraband device's signal, the direction of the contraband device, relative to the reporting device, can be refined using this information, by centralized investigative data aggregation and analysis system 175, or the like.

Additionally, or alternatively, a location of one or more controlled-environment facility personal communication and/or media devices reporting the detection of the presence of electromagnetic energy emissions may be tracked, determined or refined as discussed in co-pending, co-owned, U.S. patent application Ser. No. 16/218,957, filed Dec. 13, 2018, entitled Controlled-Environment Facility Mobile Device Location Tracking, which is incorporated herein by reference. To wit, data network interface (240) of the controlled-environment facility personal communication and/or media devices assigned to a resident, or personnel of a controlled-environment facility. A resident device establishes a connection with a resident (wireless) network via one or more network access points located within the facility. A tracking network interface, or the like, of the controlled-environment facility personal communication and/or media device transmits location tracking signals received by location tracking devices located within the facility. The controlled-environment facility personal communication and/or media device connects with the resident network via the data network interface in providing services to the device user. However, during intervals when the resident device is not connected to the resident network via the data network interface, the tracking network interface may be used to transmit the location tracking signals.

Embodiments of the present systems and methods for contraband wireless device detection integrated into controlled-environment facility communication and/or media devices, as described herein, may be implemented at least in part as, or executed, at least in part, by one or more computer systems, as discussed above. Moreover, one further computer system is illustrated in FIG. 5. In various embodiments, computer system 500 may be a server, a mainframe computer system, a workstation, a network computer, a desktop computer, a laptop, a tablet computing device, media player, or the like. For example, in some cases, computer 500 may implement one or more steps of example process 400 described above with respect to FIG. 4, and/or in addition to controlled-environment facility communication and/or media devices 105 and controlled-environment facility resident communal communication and/or media terminals or docking stations 110, described above, a computer system such as computer system 500 may be used as, or as part of, one or more of: controlled environment facility communications processing system 115, AMS 130, non-resident device 155, centralized investigative data aggregation and analysis system 175, and/or the like. In various embodiments two or more of these computer systems may be configured to communicate with each other in any suitable way, such as, for example, via public network 125, which may be the Internet, or the like, as discussed above, via a local area network using wired or wireless functionality, such as described above, etc.

As illustrated, computer system 500 includes one or more processors 510A-N coupled to a system memory 520 via bus 530. Computer system 500 further includes a network interface 540 coupled to bus 530, and one or more I/O controllers 550, which in turn are coupled to peripheral devices such as cursor control device 560, keyboard 570, display(s) 580, etc. Each of I/O devices 560, 570, 580 may be capable of communicating with I/O controllers 550, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 500 may be a single-processor system including one processor 510A, or a multi-processor system including two or more processors 510A-N (e.g., two, four, eight, or another suitable number). Processors 510 may be any processor capable of executing program instructions. For example, in various embodiments, processors 510 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 510 may commonly, but not necessarily, implement the same ISA. Also, in some embodiments, at least one processor 510 may be a graphics processing unit (GPU) or another dedicated graphics-rendering device.

System memory 520 may be configured to store program instructions and/or data accessible by processor 510. In various embodiments, system memory 520 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 520 as program instructions 525 and data storage 535, respectively. In other embodiments, program instructions and/or data may be received, sent, or stored upon different types of computer-accessible media or on similar media separate from system memory 520 or computer system 500.

A computer-accessible medium may include any tangible and/or non-transitory storage media or memory media such as electronic, magnetic, or optical media—e.g., disk or CD/DVD-ROM coupled to computer system 500 via bus 530. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 530 may be configured to coordinate I/O traffic between processor 510, system memory 520, and any peripheral devices in the computer system, including network interface 540 or other peripheral interfaces, such as I/O devices 560, 570, 580. In some embodiments, bus 530 may perform any necessary protocol, timing, or other data transformations to convert data signals from one component (e.g., system memory 520) into a format suitable for use by another component (e.g., processor 510). In some embodiments, bus 530 may include support for devices attached through various types of peripheral buses, such as a variant of the Peripheral Component Interconnect (PCI) bus standard or the Universal Serial Bus (USB) standard, for example. In some embodiments, the function of bus 530 may be split into two or more separate components, such as a northbridge chipset and a southbridge chipset, for example. In addition, in some embodiments some or all the functionality of bus 530, such as an interface to system memory 520, may be incorporated directly into processor(s) 510A-N.

Network interface 540 may be configured to allow data to be exchanged between computer system 500 and other devices attached to a network, such as other computer systems, or between nodes of computer system 500. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 550 may, in some embodiments, enable communications with one or more display terminals, keyboards, keypads, touchpads, scanning devices, voice or optical recognition devices, mobile devices, or any other devices suitable for entering or retrieving data by one or more computer system 500. Multiple I/O controllers 550 may be present in computer system 500 or may be distributed on various nodes of computer system 500. In some embodiments, I/O devices may be separate from computer system 500 and may interact with one or more nodes of computer system 500 through a wired or wireless connection, such as over network interface 540.

Figure 5:
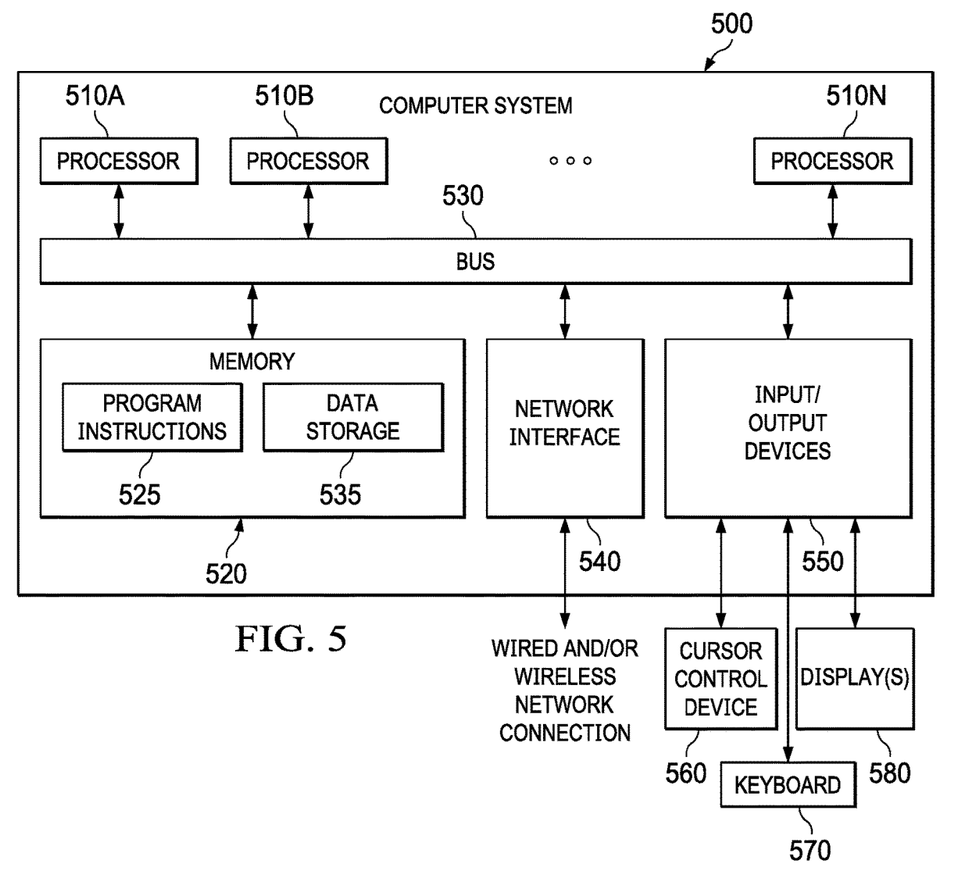
FIG. 5 is a block diagram of a computer system, device, station, or terminal configured to implement various techniques disclosed herein, according to some embodiments.

As shown in FIG. 5, system memory 520 may include program instructions 525, configured to implement certain embodiments described herein, and data storage 535, comprising various data may be accessible by program instructions 525. In an embodiment, program instructions 525 may include software elements, which may be configured to affect the operations discussed in FIGS. 1 through 4. Program instructions 525 may be implemented in various embodiments using any desired programming language, scripting language, or combination of programming languages and/or scripting languages (e.g., C, C++, C#, JAVA®, JAVASCRIPT®, PERL®, etc.). Data storage 535 may include data that may be used in these embodiments (e.g., recorded communications, profiles for different modes of operations, etc.). In other embodiments, other or different software elements and data may be included.

A person of ordinary skill in the art will appreciate that computer system 500 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various operations described herein, particularly in connection with FIGS. 1 through 5, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controlled-environment facility contraband wireless communication device detection system comprising:
one or more controlled-environment facility personal resident communication and/or media devices each adapted for communication and/or media use from within a controlled-environment facility by a resident of the controlled-environment facility, each personal resident controlled-environment facility communication and/or media device disposed within the controlled-environment facility and comprising a radio frequency detection mechanism configured to detect presence of electromagnetic energy emissions in one or more frequency bands reserved for wireless communication by wireless communication devices, and each personal resident controlled-environment facility communication and/or media device configured to report detection of the presence of electromagnetic energy emissions in one or more frequency bands reserved for wireless communication by wireless communication devices to an investigative data aggregation and analysis system.

2. The system of claim 1, wherein each personal resident controlled-environment facility communication and/or media device is further configured to report a location of the controlled-environment facility communication and/or media device within the controlled-environment facility when reporting the detection of the presence of electromagnetic energy emissions.

3. The system of claim 2, wherein the investigative data aggregation and analysis system is configured to employ reported locations of more than one of the personal resident controlled-environment facility communication and/or media devices when reporting the detection of the presence of electromagnetic energy emissions to determine a location within the controlled-environment facility of a contraband wireless communication device emitting the electromagnetic energy emissions.

4. The system of claim 2, wherein each personal resident controlled-environment facility communication and/or media device is further configured to report a signal strength of the electromagnetic energy emissions.

5. The system of claim 4, wherein the investigative data aggregation and analysis system is configured determine a perimeter of a location of a contraband device emitting the electromagnetic energy emissions based, at least in part on the location and the signal strength reported by the at least one personal resident controlled-environment facility communication and/or media device.

6. The system of claim 4, wherein the investigative data aggregation and analysis system is configured to determine a location within the controlled-environment facility of a contraband wireless communication device emitting the electromagnetic energy emissions, based at least in part on reported locations of more than one of the personal resident controlled-environment facility communication and/or media devices when reporting the detection of the presence of electromagnetic energy emissions and the signal strength reported by each of the more than one personal resident controlled-environment facility communication and/or media devices.

7. The system of claim 1, further comprising one or more controlled-environment facility personnel communication and/or media devices, each comprising a radio frequency detection mechanism configured to detect presence of electromagnetic energy emissions in one or more frequency bands reserved for wireless communication by wireless communication devices, and each configured to report detection of the presence of electromagnetic energy emissions in one or more frequency bands reserved for wireless communication by wireless communication devices to the investigative data aggregation and analysis system.

8. The system of claim 1, further comprising one or more controlled-environment facility resident communal communication and/or media terminal or docking stations, each comprising a radio frequency detection mechanism configured to detect presence of electromagnetic energy emissions in one or more frequency bands reserved for wireless communication by wireless communication devices, and configured to report detection of the presence of electromagnetic energy emissions in one or more frequency bands reserved for wireless communication by wireless communication devices to the investigative data aggregation and analysis system.

9. The system of claim 1 wherein each radio frequency detection mechanism is powered by the respective personal resident controlled-environment facility communication and/or media device.

10. A method for controlled-environment facility contraband wireless communication device detection comprising:
  deploying, within one or more personal resident controlled-environment facility communication and/or media devices, each adapted for communication and/or media use from within a controlled-environment facility by a resident of the controlled-environment facility, the one or more personal resident controlled-environment facility communication and/or media devices disposed within the controlled-environment facility, a radio frequency detection mechanism configured to detect presence of electromagnetic energy emissions in one or more frequency bands reserved for wireless communication by wireless communication devices;
  detecting, by at least one personal resident controlled-environment facility communication and/or media device disposed in the controlled-environment facility, presence of electromagnetic energy emissions in one or more frequency bands reserved for wireless communication by wireless communication devices; and
  reporting, by the at least one personal resident controlled-environment facility communication and/or media device, detection of the presence of electromagnetic energy emissions in one or more frequency bands reserved for wireless communication by wireless communication devices in the controlled-environment facility to an investigative data aggregation and analysis system.

11. The method of claim 10, further comprising, reporting, by the at least one personal resident controlled-environment facility communication and/or media device, a location of the personal resident controlled-environment facility communication and/or media device within the controlled-environment facility when reporting the detection of the presence of electromagnetic energy emissions.

12. The method of claim 11, further comprising determining a location within the controlled-environment facility of a contraband wireless communication device emitting the electromagnetic energy emissions, based at least in part on reported locations of more than one of the personal resident controlled-environment facility communication and/or media devices when reporting the detection of the presence of electromagnetic energy emissions.

13. The method of claim 11, further comprising, reporting, by the at least one personal resident controlled-environment facility communication and/or media device, a signal strength of the electromagnetic energy emissions.

14. The method of claim 13, further comprising, determining a perimeter of a location of a contraband device emitting the electromagnetic energy emissions based, at least in part on the location and the signal strength reported by the at least one personal resident controlled-environment facility communication and/or media device.

15. The method of claim 13, further comprising determining a location within the controlled-environment facility of a contraband wireless communication device emitting the electromagnetic energy emissions, based at least in part on reported locations of more than one personal resident controlled-environment facility communication and/or media devices when reporting the detection of the presence of electromagnetic energy emissions and the signal strength reported by each of the more than one personal resident controlled-environment facility communication and/or media devices.

16. The method of claim 10, further comprising:
  deploying, within one or more controlled-environment facility personnel communication and/or media devices a radio frequency detection mechanism configured to detect presence of electromagnetic energy emissions in one or more frequency bands reserved for wireless communication by wireless communication devices;
  detecting, by at least one controlled-environment facility personnel communication and/or media device disposed in the controlled-environment facility, presence of electromagnetic energy emissions in one or more frequency bands reserved for wireless communication by wireless communication devices; and
  reporting, by the at least one controlled-environment facility personnel communication and/or media device, detection of the presence of electromagnetic energy emissions in one or more frequency bands reserved for wireless communication by wireless communication devices in the controlled-environment facility to the investigative data aggregation and analysis system.

17. The method of claim 10, further comprising:
  deploying, within one or more controlled-environment facility resident communal communication and/or media terminal or docking stations a radio frequency detection mechanism configured to detect presence of electromagnetic energy emissions in one or more frequency bands reserved for wireless communication by wireless communication devices;
  detecting, by at least one controlled-environment facility resident communal communication and/or media terminal or docking station disposed in the controlled-environment facility, presence of electromagnetic energy emissions in one or more frequency bands reserved for wireless communication by wireless communication devices; and
  reporting, by the at least one controlled-environment facility resident communal communication and/or media terminal or docking station, detection of the presence of electromagnetic energy emissions in one or more frequency bands reserved for wireless communication by wireless communication devices in the controlled-environment facility to the investigative data aggregation and analysis system.

18. The method of claim 10 further comprising, powering each radio frequency detection mechanism by the respective personal resident controlled-environment facility communication and/or media device in which it is disposed.

19. A non-transitory computer-readable storage medium having program instructions stored thereon that, upon execution by at least one controlled-environment facility personal resident communication and/or media device, cause the respective personal resident controlled-environment facility communication and/or media device to:
  adapt for communication and/or media use from within a controlled-environment facility;

detect, via a radio frequency detection mechanism operatively disposed in the respective personal resident controlled-environment facility communication and/or media device, the respective personal resident controlled-environment facility communication and/or media device disposed within the controlled-environment facility, presence of electromagnetic energy emissions in one or more frequency bands reserved for wireless communication by wireless communication devices; and report the detection of presence of electromagnetic energy emissions in one or more frequency bands reserved for wireless communication by wireless communication devices to an investigative data aggregation and analysis system.

* * * * *